United States Patent [19]
Borchelt et al.

[11] Patent Number: 5,605,371
[45] Date of Patent: Feb. 25, 1997

[54] LIGHT WEIGHT STEEL AUTO BODY CONSTRUCTION

[75] Inventors: James E. Borchelt, Hobart; John M. Lude, Beverly Shores, both of Ind.; Bernard S. Levy, Chicago, Ill.

[73] Assignee: Inland Steel Company, Chicago, Ill.

[21] Appl. No.: 416,507

[22] Filed: Apr. 4, 1995

Related U.S. Application Data

[63] Continuation-in-part of Ser. No. 231,834, Apr. 25, 1994, abandoned.

[51] Int. Cl.⁶ .................................................. B62D 25/10
[52] U.S. Cl. .......................... 296/188; 296/76; 296/191; 180/69.2
[58] Field of Search ...................... 296/187, 188, 296/189, 191, 196, 76, 203, 205; 180/69.2, 69.21

[56] References Cited

U.S. PATENT DOCUMENTS

| | | | |
|---|---|---|---|
| 2,709,108 | 5/1955 | Eggert, Jr. | 296/76 |
| 4,045,075 | 8/1977 | Pulver | 296/205 |
| 4,397,914 | 8/1983 | Miura et al. | 428/43 |
| 4,444,818 | 4/1984 | Tominaga et al. | 428/36 |
| 4,451,077 | 5/1984 | Bruhnke et al. | 296/188 X |
| 4,569,880 | 2/1986 | Nishiyama et al. | 428/212 |
| 4,634,167 | 1/1987 | Moriki et al. | 180/69.2 X |
| 5,000,997 | 3/1991 | Ritchie et al. | 180/69.2 X |
| 5,080,427 | 1/1992 | Sturrus et al. | 296/188 |
| 5,149,167 | 9/1992 | Rieck et al. | 296/188 X |
| 5,232,261 | 8/1993 | Kuroda et al. | 296/146.4 |

FOREIGN PATENT DOCUMENTS

| | | | |
|---|---|---|---|
| 2383059 | 11/1978 | France | 296/188 |
| 1627719 | 3/1972 | Germany. | |
| 2934430 | 3/1981 | Germany. | |
| 57-178925 | 11/1982 | Japan. | |
| 60-124575 | 7/1985 | Japan | 180/69.2 |
| 3-54079 | 3/1991 | Japan | 180/69.2 |
| 54079 | 3/1991 | Japan | 180/69.2 |
| 4055175 | 2/1992 | Japan | 180/69.2 |
| 5-278637 | 10/1993 | Japan | 180/69.2 |
| 1284443 | 8/1972 | United Kingdom | 180/69.2 |

OTHER PUBLICATIONS

Photographs of Mercedes–Benz 280C hood assembly, no date.

*Primary Examiner*—Dean Kramer
*Attorney, Agent, or Firm*—Marshall, O'Toole, Gerstein, Murray & Borun

[57] ABSTRACT

An automobile body panel has an outer contour-defining component and an inner structural component. The inner structural component comprises a front member, a rear member, a plurality of side members, a central region defined by the front, rear, and side members, and at least one internal member disposed in the central region, and may also include at least one cross member disposed in the central region. The side members and each internal member have a substantially closed cross-sectional geometry. The outer component is secured to the inner structural component at the periphery of the panel. In addition, the outer component is substantially continuously adhesively bonded to each internal member, to flanges of the front and rear members, to each cross member and to the upper surface of each side member. The resulting panel is light-weight, has a high degree of rigidity, is capable of absorbing crash energy in frontal impact, and is resistant to puckering and oil canning. An alternative embodiment comprises a combined hood-fender body panel. The combined hood-fender has side members which form a structural interface with "A" pillars of the automobile to facilitate load transfer in a frontal impact.

24 Claims, 7 Drawing Sheets

LIGHT WEIGHT STEEL AUTO BODY CONSTRUCTION

CROSS-REFERENCE TO RELATED APPLICATION

This application is a continuation-in-part of application Ser. No. 08/231,834 filed Apr. 25, 1994 now abandoned.

FIELD OF THE INVENTION

The present invention relates generally to automobile body panel structures and more particularly to light weight automobile body panels, for use in structures such as hoods and deck lids, and which have strength-to-weight ratios superior to conventional body panels.

BACKGROUND

Modern automobile design requires light weight structures in order to comply with increasingly stringent fuel economy requirements. Regulatory requirements such as the Corporate Average Fuel Economy (C.A.F.E.) standards have put increasing pressure on automobile manufacturers to produce light weight automobiles. In addition, crashworthiness requirements are also becoming more demanding. Therefore, there is a need in the automobile industry for automobile structures having both high-strength and light-weight characteristics.

Automobile body panels are good candidates for significant weight savings in automobile structures. In typical automobile body panels, such as hoods and deck lids, a two piece design is used. An outer piece or component, typically sheet metal, serves to define the contours of the body. An inner piece or component, typically a steel stamping, serves to support the outer piece and absorb loads applied to the panel. The outer piece is joined to the inner piece at the peripheral sides of the panel. In the central portion of the panel, the outer piece is relatively loosely bonded to the inner piece with non-structural adhesive. This adhesive is applied in various regions of the inner surface of the outer piece in order to stabilize the structure of the panel. However, because the adhesive is not applied in a continuous fashion, and because the adhesive has a low modulus of elasticity, the inner and outer pieces are not tightly bonded together in the central region of the panel. As a result, under some loading conditions, the inner stamping is structurally independent from the outer contour-defining component. Thus, the inner stamping must have a higher thickness than would be required if the outer contour-defining component contributed to the stiffness of the panel.

In such panels, the inner and outer components do not effectively cooperate to absorb high loads, especially those encountered during impact. In typical automobiles, the hood is designed to "tepee," or fold upward, in a frontal impact. The purpose of such tepeeing during a frontal impact is to prevent the hood from impinging the windshield and injuring the occupants of the automobile. As such, the hood contributes a negligble percentage of the automobile's overall crash energy absorption capability. In order to make up for the lack of energy absorption of the hood, other structural components such as fenders have to be over-designed. As a result, from the standpoint of minimizing weight, the overall automobile is not as structurally efficient as may be desired.

Another problem with typical panel designs is caused by puckering of the outer piece due to shrinkage of the adhesive as it sets. The adhesive tends to flow outward as pressure is applied during the bonding process. However, the geometry of the interface between the outer and inner pieces of the panel is relatively flat, and the flow of adhesive is limited by the viscosity of the adhesive and the shear forces applied to the adhesive by the outer and inner pieces of the panel. A flat interface does not permit adhesive to flow away from the plane of the interface when pressure is applied.

Puckering is reflected by small, localized indentations which are formed on the outer surface of the panel due to the pull of adhesive on the inner surface of the sheet metal once the pressure applied during the bonding process is released and the adhesive has set. Puckering is undesirable in automobile body panels because it prevents the automobile from having a smooth, uniform finish. Puckering is aggravated when the interface between the outer and inner pieces of the panel is flat.

Yet another problem found in typical hood and deck lid panels is insufficient resistance to "oil canning." Oil canning occurs when, as pressure is applied to a body panel such as a hood, the panel "pops" in as though it were the bottom of an oil can. Oil canning is exemplified when the automobile panel is subjected to pressure loads when the owner is waxing or drying off the automobile. Oil canning at such relatively low loads is caused by a lack of adequate panel stiffness in the direction normal to the surface of the sheet metal.

Oil canning at low loads such as those applied during waxing or drying of an automobile is perceived negatively by consumers. Therefore, it is desirable to produce light weight automobile panels which have a sufficiently high oil canning stiffness so that oil canning is not exhibited during normal use of the automobile.

Palm printing is a further problem associated with automobile hood structures. Palm printing is the existence of permanent deformation in the surface of the hood due to loads applied in order to close the hood. Palm printing typically occurs when excessive downward pressure is applied to a forward end portion of the hood. Palm printing is most likely to occur if the user slams the hood when lowering the hood in order to ensure that the hood latches in the closed position. In order to ensure a smooth appearance of the hood, palm printing is to be avoided as much a possible.

SUMMARY OF THE INVENTION

The present invention comprises an automobile panel having an outer contour-defining component and an inner structural component. The inner structural component is comprised of side members and at least one internal member, each having substantially closed, curved cross-sections; and there are members having open cross-sections, at opposite ends of the panel.

The side members and open-section end members define the boundaries of a central region of the panel. Each internal member is disposed within the central region of the panel. The closed cross-section internal members and side members are substantially continuously bonded to the outer contour-defining component. A surface of each side member is joined to peripheral sides of the outer contour-defining component.

An embodiment of the present invention uses an inner structural component comprising front and rear steel stampings which are joined by closed cross-section side members and diagonally disposed internal members. The front and rear stampings are generally hat-shaped in cross-section.

The inner structural component is joined to the outer contour-defining component at the periphery of the panel, as in conventional automobile body panels. In addition, the diagonal internal members and the side members are joined to the outer contour-defining component with continuous adhesive bonding, using a structural adhesive. There may be a cross member extending between the two diagonal internal members and fixedly attached thereto. Also, the front and rear stampings are bonded to the outer contour-defining component.

Another embodiment of the present invention comprises a combined hood-fender. The combined hood-fender is constructed similarly to the embodiment described above. An outer contour-defining component is rigidly joined to an inner structural component at the forward and rearward ends of the hood-fender. In addition, the outer contour-defining component is continuously bonded to internal and side members of the inner structural component. The rearward ends of the side members form a structural interface with an A-pillar of the automobile so that frontal impact loads can be transferred from the hood-fender to the rearward structure of the automobile.

An automobile body panel constructed in accordance with the present invention has a superior strength to weight ratio as compared to typical automobile body panels. In addition, the structure can be tailored to provide desired load paths for different operating conditions. In particular, a hood panel made in accordance with the present invention provides additional structural integrity for a frontal impact condition. This is due to the increased structural rigidity of the panel made in accordance with the present invention. The hood made in accordance with the present invention can be designed to absorb some crash energy before tepeeing. This can be accomplished, for example, by having the side and internal members flattened or creased at strategic locations to facilitate tepeeing at a desired load level.

In accordance with the present invention, it is possible to use a different material and/or geometry for each structural member in order to optimize the strength to weight ratio of the panel.

The use of at least one internal member, combined with continuous bonding of each internal member to the outer contour-defining component, reduces the effective unreinforced area of the outer contour-defining component. This results in a panel with higher resistance to oil canning.

Because each of the internal and side members has a generally curved outer surface, the adhesive can flow in a direction away from the interface between the inner and outer components of the panel when bonding pressure is applied. This results in a panel without perceptible puckering.

Other features and advantages are inherent in the method and apparatus claimed and disclosed or will become apparent to those skilled in the art from the following detailed description in conjunction with the accompanying diagrammatic drawings.

DETAILED DESCRIPTION

Figure 1:
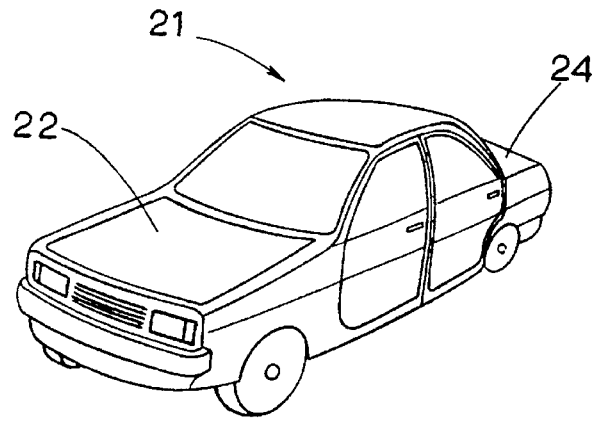
FIG. 1 is a perspective of an automobile incorporating an embodiment of the present invention.
Figure 2:
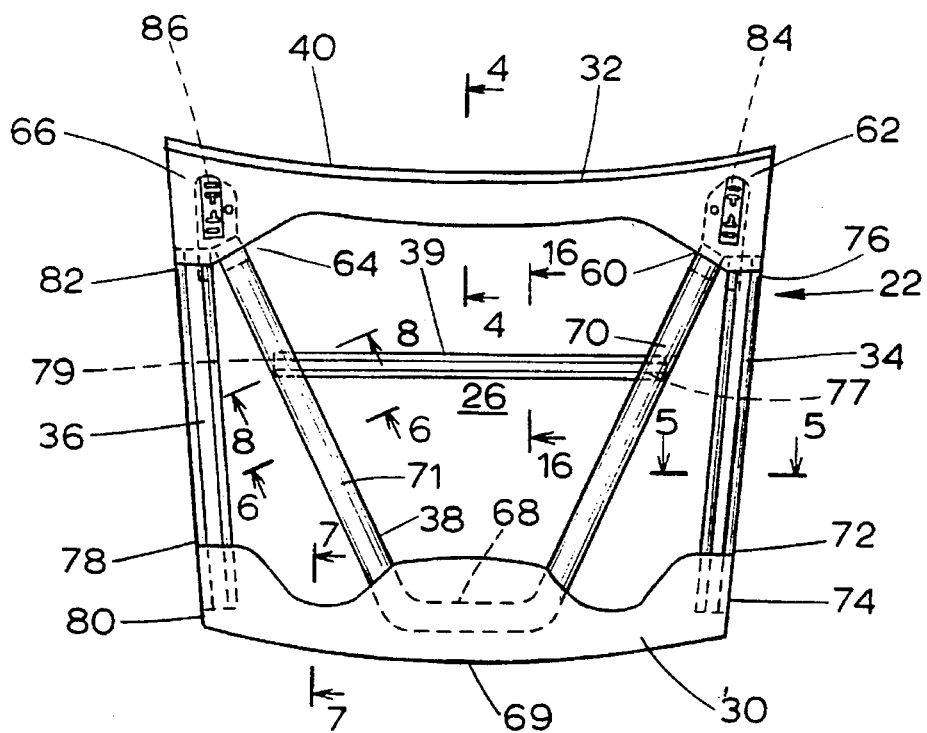
FIG. 2 is a bottom plan view of an embodiment of an automobile hood in accordance with the present invention.

FIG. 1 shows an automobile indicated generally at 21 and comprising a hood 22 and a rear deck lid 24, each of which may be constructed in accordance with an embodiment of the present invention. Referring to FIG. 2, the hood, indicated generally at 22 comprises an outer contour-defining component 26, typically composed of sheet metal (e.g., steel sheet), and which is fixedly attached to an inner structural component indicated generally at 28. Inner structural component 28 comprises a front member 30 and a rear member 32, each typically a steel stamping.

Figure 7:
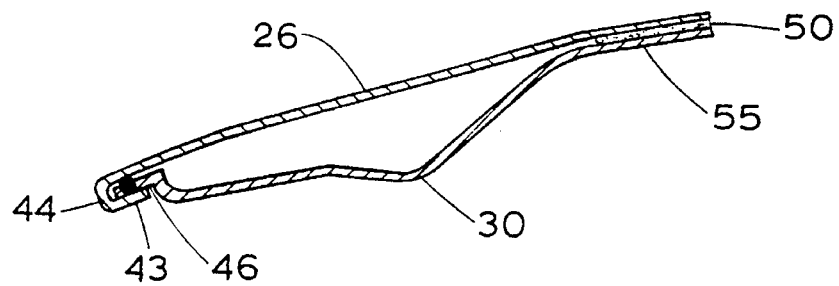
FIG. 7 is a sectional view, taken along lines 7—7 of FIG. 2.

Front member 30 and rear member 32 are fixedly attached to, and joined by, a first side member 34, a second side member 36, and an internal member 38. A cross member 39 is fixedly attached to internal member 38. Rear member 32 and front member 30 each have a substantially hat-shaped cross-section, as shown in FIGS. 4 and 7, respectively.

Because the members comprising the inner structural component 28 (e.g. front member 30, rear member 32, side members 34, 36, internal member 38 and cross member 39) are individually formed, each may have a different geometry and each may be made of a different material. In order to minimize the weight or optimize the structural properties of the hood 22, it may be desirable to construct the front member 30 and the rear member 32 of a material having a yield strength that differs from that of the material from which the internal member 38 and/or the side members 34, 36 are constructed. For example, the front member 30 and the rear member 32 could be constructed of a material having a yield strength of 35 KSI (241 MPa), whereas the internal member 38 and the side members 34, 36 could be constructed of a material having a yield strength of 50 KSI (345 MPa).

Figure 5:
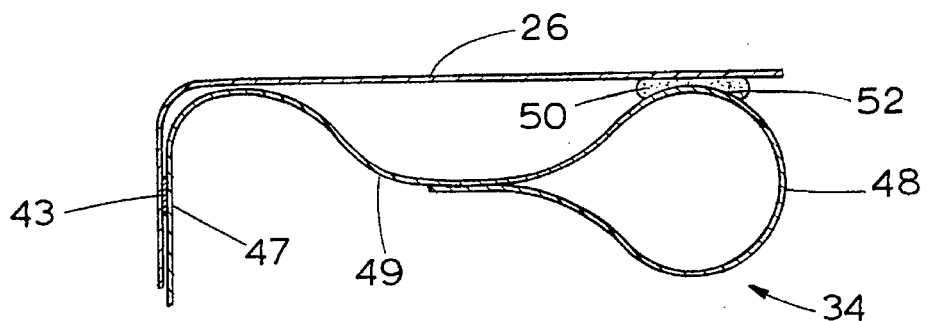
FIG. 5 is a sectional view, taken along lines 5—5 of FIG. 2.

Each of side members 34 and 36 is roll formed (e.g. precision roll formed) and then closed (e.g. using either continuous or spot welding). FIG. 5 shows a cross-sectional view of first side member 34. It should be noted that second side member 36 has a cross-sectional geometry that is a mirror image of that shown in FIG. 5. As shown in FIG. 5, when viewed in cross-section, each side member 34 and 36 has an outboard vertical flange 47, an inboard, closed-section portion 48, and a web portion 49 connecting vertical flange 47 to closed-section portion 48. Vertical flange 47 is substantially orthogonal to the plane of inner structural component 28.

Figure 4:
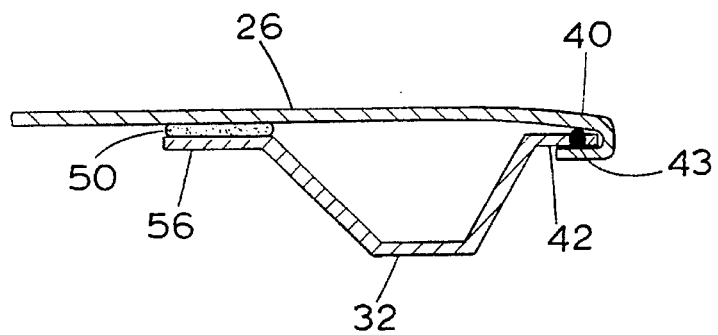
FIG. 4 is a sectional view, taken along lines 4—4 of FIG. 2.

Referring to FIG. 4, outer component 26 has a rearward end portion 40 hemmed and joined to a rearward flange 42 of rear member 32 at a plurality of welds 43. Wherever joining or welds 43 are referred to herein, it should be noted that any suitable securing means may be used, including among other things, various methods of welding (e.g. spot welding, continuous welding or laser welding), or adhesive bonding. Outer component 26 has a forward end portion 44 hemmed and joined to a forward flange 46 of front member 30 at a plurality of welds 43 (FIG. 7). Outer component 26 is also joined to vertical flange 47 of each side member 34 and 36 at a plurality of welds 43, shown in FIG. 5. Alternatively, vertical flange 47 may be omitted, and outer component 26 may be hemmed and joined (e.g. welded) to web portion 49 of each side member, 34 and 36.

Figure 6:
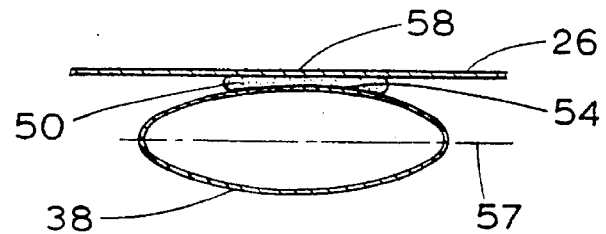
FIG. 6 is a sectional view, taken along lines 6—6 of FIG. 2.

In addition, outer component 26 is continuously bonded by an adhesive 50, at a bonding area 58, to an upper surface 52 of each side member 34 and 36 (FIG. 5), to an upper surface 53 of cross member 39 (FIG. 16) and to an upper surface 54 of internal member 38 (FIG. 6). Similar bonding arrangements adhere outer component 26 to a rearward flange 55 of front member 30 (FIG. 7), and to a forward flange 56 of rear member 32 (FIG. 4). Flanges 42 and 56 of rear member 32 (FIG. 4), and flanges 46 and 55 of front member 30 (FIG. 7), are substantially parallel to outer component 26, and substantially conform to the shape thereof.

The term "continuous bonding" means adhesive 50 is applied substantially without interruption substantially along the entire length of the member of inner structural component 28 being bonded to outer component 26. Adhesive 50 may be, for example, an epoxy-based structural adhesive.

As shown in FIG. 6, internal member 38 has a substantially elliptically-shaped cross-sectional geometry, wherein the major axis 57 of the ellipse is substantially parallel to the plane of inner structural component 28. The elliptical cross-sectional shape of internal member 38 provides a large bonding area 58 while reducing the dimension of inner structural component 28 in a direction transverse to the plane of outer component 26. However, other cross-sectional geometries, such as a circular-shape, may be employed. The internal member 38 may be formed from a tube that has been roll formed and then subjected to hydroforming, in order to allow the internal member 38 to conform to the shape of the outer component 26 having curvature in two directions (double curvature). This is a common expedient in cases where such double curvature is present, and the side members 34 and 36 may be formed in such a fashion as well. Roll forming alone is generally adequate where there is curvature only in one direction.

Figure 16:
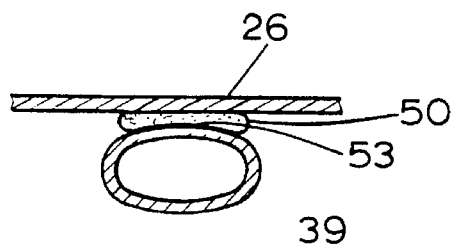
FIG. 16 is a sectional view, taken along lines 16—16 of FIG. 2.

Moreover, another advantage of hydrogorming is that it can provide a shape having discontinuities without the need for further forming operations. For example, by hydroforming the internal member 38, the shape of the internal member 38 may be tailored to follow discontinuities in the shape of the hood 22, such as feature lines (not shown). As discussed further below with regard to FIGS. 8–11, the hydroformed internal member 38 can also be provided with integral notches or flattened areas, for example, to ccommodate the cross member 39. The convex geometry of upper surface 52 of each side member 34 and 36 (FIG. 5), and upper surface 54 of internal member 38 (FIG. 6) provides room for adhesive 50 to flow away from bonding area 58 when bonding pressure is applied to press inner structural component 28 and outer component 26 together. This bonding arrangement eliminates perceptible puckering of outer component 26. As seen in FIG. 16, cross member 39 may have a similar cross-sectional geometry to that of internal member 38. Alternatively, cross member 39 may have any other suitable cross-sectional geometry, e.g. hat-shaped.

Figure 3:
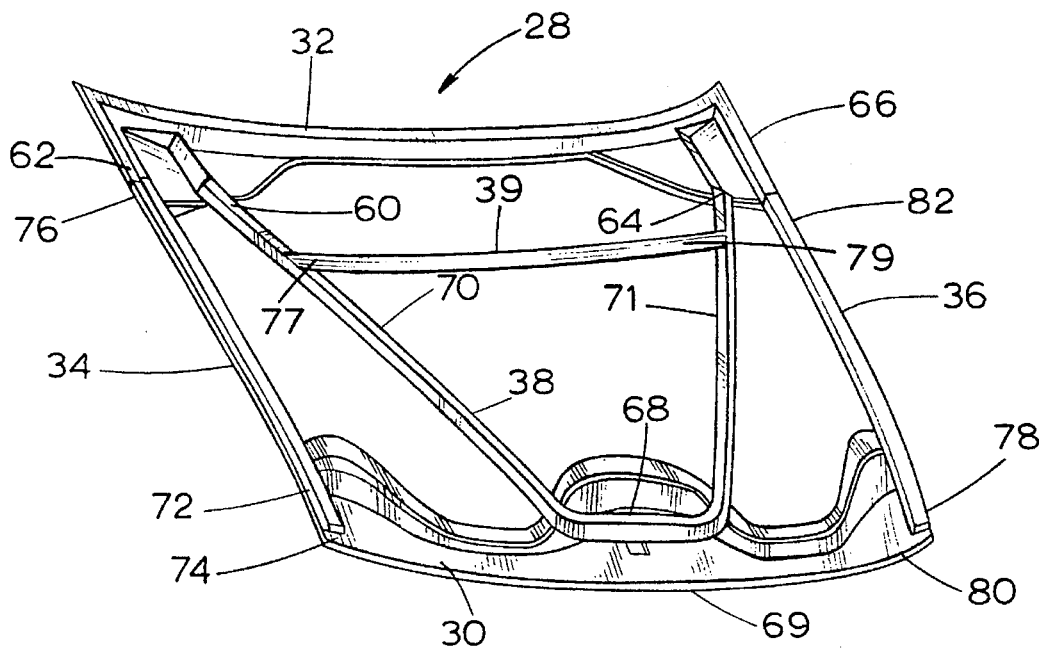
FIG. 3 is an isometric view taken from above and showing the inner component of an automobile hood embodying the present invention.

As seen in FIGS. 2 and 3, a first end portion 60 of internal member 38 is joined to rear member 32 at a first end portion 62 of rear member 32. A second end portion 64 of internal member 38 is joined to a second end portion 66 of rear member 32. A middle segment 68 of internal member 38 is joined to front member 30 at an intermediate region 69 substantially at the middle of front member 30. A first end portion 72 of first side member 34 is joined to a first end portion 74 of front member 30. A second end portion 76 of first side member 34 is joined to first end portion 62 of rear member 32. Similarly, a first end portion 78 of second side member 36 is joined to a second end portion 80 of front member 30, and a second end portion 82 of second side member 36 is joined to second end portion 66 of rear member 32.

Internal member 38 comprises a pair of converging diagonal segments 70, 71. A first diagonal segment 70 of internal member 38 extends from middle segment 68 to first end portion 60 of internal member 38. A second diagonal segment 71 of internal member 38 extends from middle segment 68 to second end portion 64 of internal member 38.

Cross member 39 extends between diagonal segments 70 and 71 of internal member 38. A first end portion 77 of cross member 39 is joined to first diagonal segment 70. A second end portion 79 of cross member 39 is joined to second diagonal segment 71. Cross member 39 is located approximately half way between front member 30 and rear member 32. Cross member 39 is substantially parallel to front member 30 and rear member 32. Cross member 39 may be joined to diagonal segments 70 and 71 of internal member 38 using any of the attachment arrangements shown in FIGS. 8–11 and described below.

Figure 8:
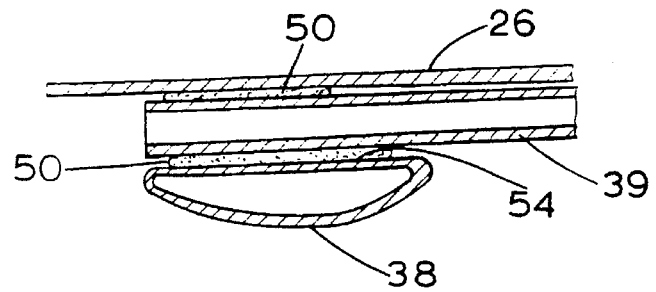
FIG. 8 is a sectional view, taken along lines 8—8 of FIG. 2.

FIG. 8 shows an attachment arrangement wherein upper surface 54 of internal member 38 is locally flattened, and cross member 39 is disposed between upper surface 54 and outer component 26. Adhesive 50. is used to join cross member 39 to internal member 38 and outer component 26.

Figure 9:
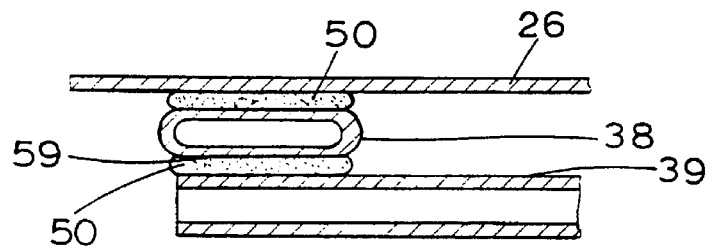
FIG. 9 is a view similar to FIG. 8, of an alternative embodiment of an automobile hood embodying the present invention.

FIG. 9 shows an attachment arrangement wherein a lower surface 59 of internal member 38 is locally flattened and cross member 39 is disposed below lower surface 59 and joined thereto using adhesive 50.

Figure 10:
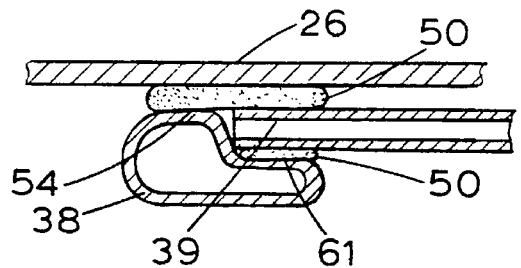
FIG. 10 is a view similar to FIG. 8, of a further alternative embodiment of an automobile hood embodying the present invention.

FIG. 10 shows an attachment arrangement wherein upper surface 54 of internal member 38 is locally partially flattened, forming an upward facing step portion 61 of internal member 38. Cross member 39 is disposed between, and joined to, upward facing step portion 61 and outer component 26 using adhesive 50.

Figure 11:
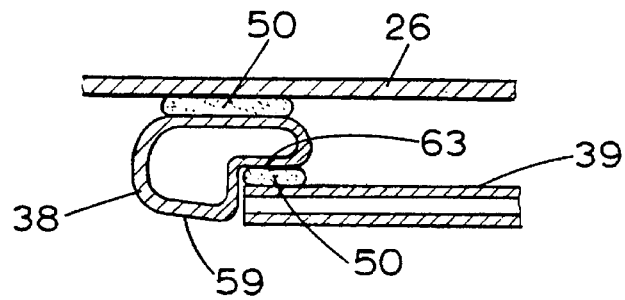
FIG. 11 is a view similar to FIG. 8, of a still further alternative embodiment of an automobile hood embodying the present invention.

FIG. 11 shows an attachment arrangement wherein lower surface 59 of internal member 38 is locally partially flattened, forming a downward facing step portion 63 of internal member 38. Cross member 39 is joined to downward facing step portion 63 using adhesive 50.

Figure 17:
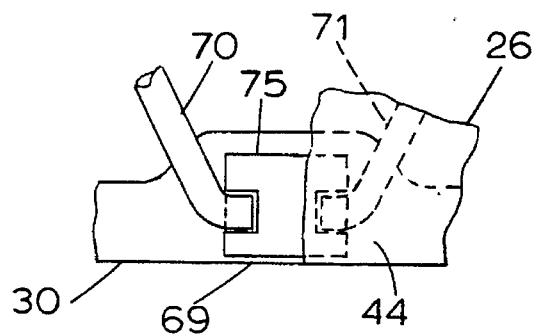
FIG. 17 is a top plan view of the intermediate region of an alternative embodiment of a front member of an automobile hood embodying the present invention.

Alternatively, each diagonal segment, 70 and 71, may be a separate member. Such an arrangement is shown in FIG. 17. Middle segment 68 is omitted and replaced with an anti-palm printing member 75, joined to front member 30 and each diagonal segment, 70 and 71. Anti-palm printing member 75 is joined to, and supports, forward end portion 44 of outer component 26 at intermediate region 69 of front member 30 to prevent palm printing when the hood is closed. Preferably, anti-palm printing member 75 follows the contour of forward end portion 44 of outer component 26 at intermediate region 69 of front member 30. An array of spots of soft adhesive (not shown) may be used to join anti-palm printing member 75 to outer component 26.

Hood 22 may be attached to automobile 21 using any suitable means. For example, hinges (not shown) may be joined to each of ends 62 and 66 of rear member 32 using hinge reinforcements. Specifically, a first hinge reinforcement 84 may comprise a steel stamping joined or secured to: first end portion 62 of rear member 32, second end portion 76 of first side member 34, and first end portion 60 of internal member 38. A second hinge reinforcement 86 may comprise a steel stamping joined or secured to: second end portion 66 of rear member 32, second end portion 82 of second side member 36, and second end portion 64 of internal member 38. Hinge reinforcements 84 and 86 need not be joined to end portions 60 and 64 of internal member 38 which may be directly secured to rear member 32. However, for added stiffness and strength in the vicinity of the hinge reinforcements 84 and 86, the end portions 60 and 64 may be joined or secured to each respective hinge reinforcement 84, 86 with a substantial overlap therebetween.

The use of continuous bonding of diagonal segments 70 and 71 of internal member 38 and side members 34 and 36 to outer component 26 results in an increase in the structural rigidity of hood 22. As such, hood 22 is capable of absorbing significant crash energy from a frontal impact before the onset of tepeeing. This also results in a reduction of the effective unreinforced area of outer component 26, thereby increasing the resistance to oil canning of hood 22.

Figure 12:
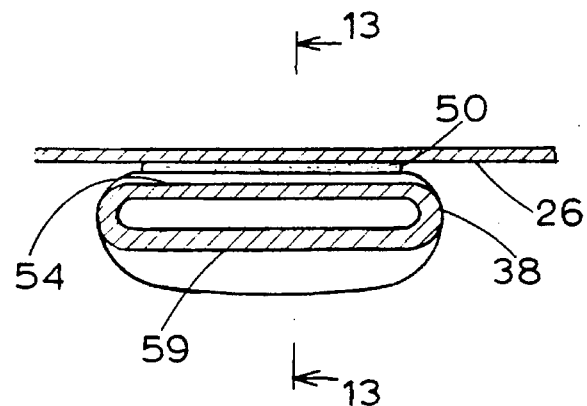
FIG. 12 is a view similar to FIG. 6, of an alternative embodiment of an automobile hood embodying the present invention.
Figure 13:
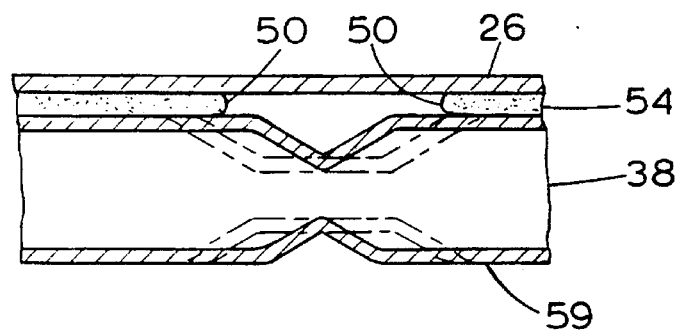
FIG. 13 is a sectional view, taken along lines 13—13 of FIG. 12.
Figure 14:
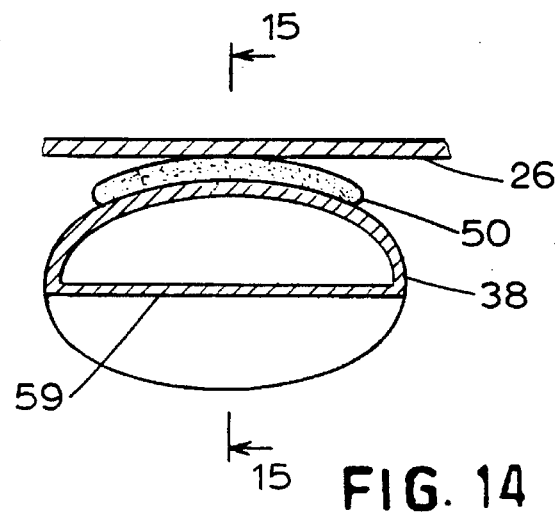
FIG. 14 is a view similar to FIG. 6, of a further alternative embodiment of an automobile hood embodying the present invention.
Figure 15:
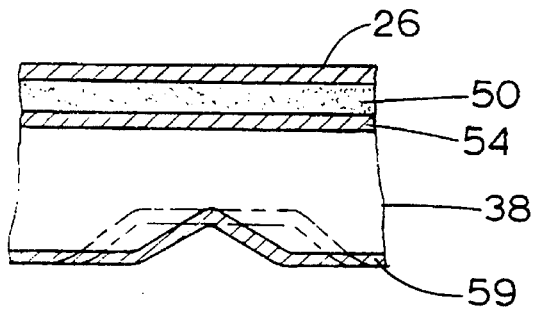
FIG. 15 is a sectional view, taken along lines 15—15 of FIG. 14.

To ensure that hood 22 tepees properly in a crash condition, internal member 38 may be creased or locally flattened to produce the cross-sectional geometries shown in FIGS. 12–15. As shown in FIGS. 14 and 15, lower surface 59 of internal member 38 may be creased or locally flattened (dash-dot lines in FIG. 15). Alternatively, as shown in FIGS. 12 and 13, both upper surface 54 and lower surface 59 of internal member 38 may be creased or locally flattened (dash-dot lines in FIG. 13). This local flattening or creasing of internal member 38 reduces the bending strength of internal member 38 in the flattened or creased areas. In this manner, the tepeeing characteristics of hood 22 may be controlled. Although not shown in the drawings, side members 34 and 36 may also be creased or locally flattened in order to control tepeeing performance.

Local flattening of internal member 38 may also be used to provide clearance for the installation of hardware. For example, middle portion 68 of internal member 38 may be locally flattened to allow clearance for a latch mechanism (not shown) which secures front member 30 of hood 22 to automobile 21. Internal member 38 may also be locally flattened to allow for attachment of gas struts (not shown) to diagonal segments 70 and 71. Such struts are often used to support hood 22 in an open position.

It should be noted that front member 30, rear member 32, side members 34 and 36, internal member 38, and cross member 39 may each include holes therein (not shown). Such holes can serve, for example, for attachment of sound deadening material (not shown) to hood 22.

Figure 18:
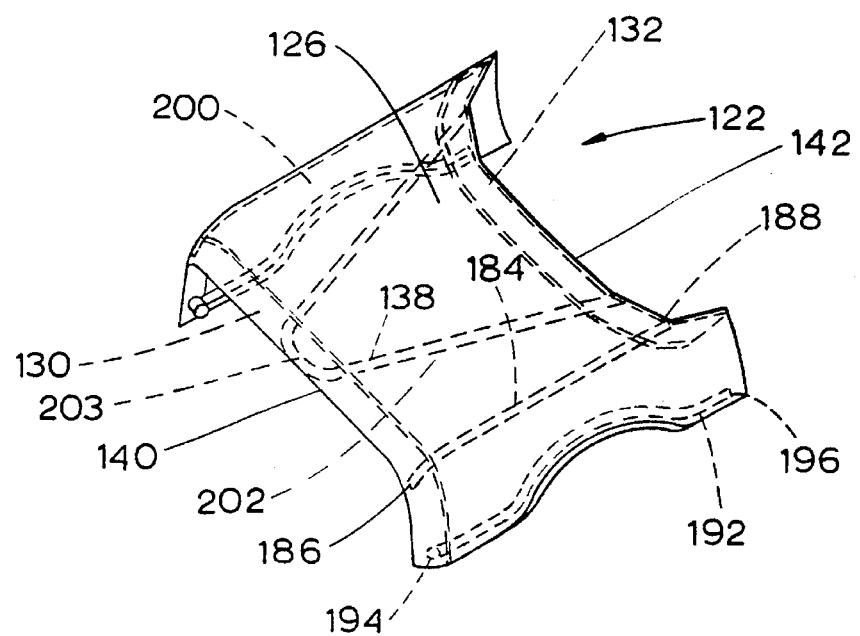
FIG. 18 is a perspective of an embodiment of a combined hood-fender for an automobile, in accordance with the present invention.
Figure 19:
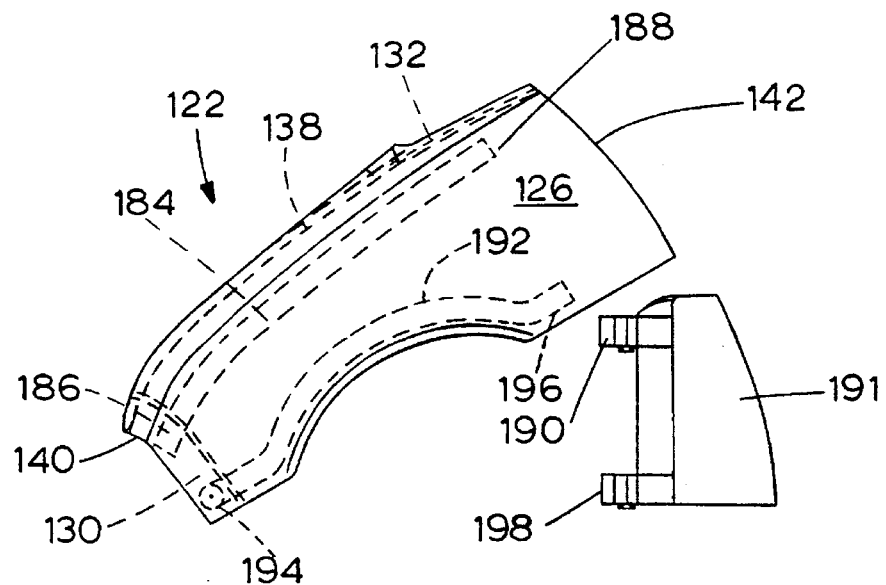
FIG. 19 is a side view of the combined hood-fender of FIG. 18, in an open position.
Figure 20:
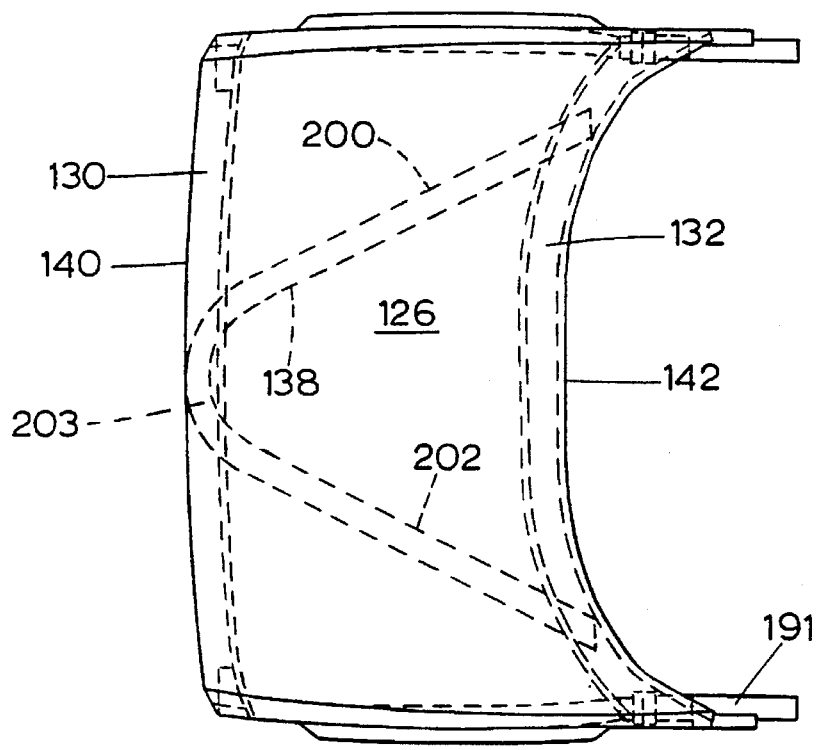
FIG. 20 is a plan view of the combined hood-fender of FIG. 18, in an open position.

Another embodiment of the present invention, comprising a combined hood-fender indicated generally at 122, is depicted in FIGS. 18 through 20 and described below. The construction of combined hood-fender 122 is substantially similar to that of hood 22 depicted in FIGS. 2 through 17. It will be appreciated that any of the features of hood 22 may be incorporated into combined hood-fender 122.

Now referring to FIGS. 18 through 20, an outer contour-defining component.126, typically sheet metal, is joined to a front member 130 and a rear member 132, along forward and rearward end portions, 140 and 142, respectively, of outer component 126. An upper side member 184 is joined to front member 130 at a forward end portion 186 of upper side member 184. On each side of hood-fender 122, a flared rearward facing end portion 188 of upper side member 184 is aligned with an upper, forward facing projection 190 of an "A" pillar 191 (FIG. 19) of the automobile 21, when the hood is closed.

Similarly, a lower side member 192 is joined to front member 130 at a forward end portion 194 of lower side member 192. On each side of automobile 21, a flared rearward facing end portion 196 of lower side member 192 is aligned with a lower forward facing projection 198 of "A" pillar 191 of automobile 21, when the hood-fender 122 is closed. Forward end portion 194 of lower side member 192 may be used as a hinge means which is pivotally attached to the forward structure (not shown) of automobile 21 on each side of automobile 21.

As shown in FIG. 19, combined hood-fender 122 is opened by lifting rearward end portion 142 of outer component 126 of combined hood-fender 122. An internal member 138 (FIG. 20), comprising a first diagonal segment 200, a second diagonal segment 202, and a middle segment 203 joins forward and rear members 128 and 126 in substantially the same manner as described above in reference to hood 22 depicted in FIGS. 2–17. Internal member 138 and side members 130 of combined hood-fender 122 are substantially continuously bonded to outer component 126.

The foregoing detailed description has been given for clearness of understanding only and no unnecessary limitations should be understood therefrom, as modifications will be obvious to those skilled in the art.

We claim:

1. An automobile body panel comprising:

an outer contour-defining component;

an inner structural component comprising a plurality of individually formed members joined together to form said inner structural component;

said individually formed members including individually formed front and rear members;

said individually formed members comprising a plurality of individually formed side members each having a substantially closed cross-sectional geometry;

said inner structural component having a central region substantially enclosed by said front member, said rear member, and said side members;

said individually formed members further including at least one individually formed internal member, each internal member having a substantially closed cross-sectional geometry and being disposed in said central region; and means for substantially continuously bonding each of said side members and each internal member to said outer contour-defining component.

2. The automobile body panel of claim 1 wherein:

said side members are adhesively bonded to said outer contour-defining component.

3. The automobile body panel of claim 1 wherein:

said side members are welded to said outer contour-defining component.

4. The automobile body panel of claim 1 wherein:

said inner structural component lies substantially in a plane;

each side member comprises a flange substantially orthogonal to said plane; and said flange of each side member is bonded to said outer contour-defining component.

5. The automobile body panel of claim 1 wherein:

said front member has a substantially open cross-sectional geometry.

6. The automobile body panel of claim 5 wherein:

said open cross-sectional geometry of said front member is substantially hat-shaped.

7. The automobile body panel of claim 1 wherein:

said rear member has a substantially open cross-sectional geometry.

8. The automobile body panel of claim 7 wherein:

said open cross-sectional geometry of said rear member is substantially hat-shaped.

9. The automobile body panel of claim 1 wherein:

said inner structural component lies substantially in a plane; and each internal member has a substantially elliptically-shaped cross-sectional geometry, with the major axis of said ellipse being substantially parallel to said plane.

10. The automobile body panel of claim 1 wherein:

said inner structural component comprises a single internal member having first and second end portions and first, second and third integrally connected segments;

said plurality of side members includes first and second side members each having first and second end portions;

said front and rear member each comprise a first and second end portion;

said first end portion of said first side member is fixedly connected to said first end portion of said front member;

said second end portion of said first side member is fixedly connected to said first end portion of said rear member;

said first end portion of said second side member is fixedly connected to said second end portion of said front member;

said second end portion of said second side member is fixedly connected to said second end portion of said rear member;

said front member has an intermediate region located between said first and second end portions of said front member;

said first end portion of said internal member is fixedly attached to said rear member at said first end portion of said rear member;

said first segment of said internal member extends between said first end portion of said rear member and said intermediate region;

said second segment of said internal member extends along said intermediate region and is fixedly attached thereto;

said third segment of said internal member extends between said intermediate region and said second end portion of said rear member; and said second end portion of said internal member is fixedly attached to said second end portion of said rear member.

11. The automobile body panel of claim 10 further including a cross member fixedly attached to, and extending between, said first and second segments of said internal member.

12. The automobile body panel of claim 1 wherein:

said inner structural component comprises first and second internal members each having first and second end portions;

said plurality of side members includes first and second side members each having first and second end portions;

said front and rear member each comprise first and second end portions;

said first end portion of said first side member is fixedly connected to said first end portion of said front member;

said second end portion of said first side member is fixedly connected to said first end portion of said rear member;

said first end portion of said second side member is fixedly connected to said second end portion of said front member;

said second end portion of said second side member is fixedly connected to said second end portion of said rear member;

said front member has an intermediate region located between said first and second end portions of said front member;

said first end portion of said first internal member is fixedly attached to said rear member at said first end portion of said rear member;

said first internal member extends between said first end portion of said rear member and said intermediate region;

said inner structural component comprises an anti-palm printing member extending along said intermediate region and fixedly attached thereto;

said second end portion of said first internal member is fixedly attached to said anti-palm printing member;

said first end portion of said second internal member is fixedly attached to said second end portion of said rear member;

said second internal member extends between said intermediate region and said second end portion of said rear member; and said second end portion of said second internal member is fixedly attached to said anti-palm printing member.

13. The automobile body panel of claim 12 and further including a cross member fixedly attached to, and extending between, said first and second internal members.

14. The automobile body panel of claim 1 wherein:

said outer contour-defining component, said side members, each internal member, and said bonding means comprise means cooperating to incorporate said panel into an impact-resistant, crash energy absorbing, load bearing structure for the automobile of which said panel is a part.

15. The automobile body panel of claim 14 wherein:

said panel is a hood panel; and said incorporating means includes means for delaying the onset of a tepee effect upon a frontal impact between the automobile and another object.

16. The automobile body panel of claim 1 wherein:

said outer contour-defining component, said side members, each internal member, and said bonding means comprise means cooperating to produce an automobile body panel which is resistant to oil canning and puckering.

17. The automobile body panel of claim 1 wherein:

said side members and each internal member is bonded to said outer contour-defining component at a bonding surface of each side member and each internal member;

said side members and each internal member comprise curved surfaces at said bonding surfaces;

said bonding means comprises structural adhesive applied substantially continuously along said bonding surfaces of each side member and each internal member;

said curved surfaces comprise means for allowing said adhesive to flow away from said outer contour-defining component as said adhesive sets, whereby puckering of said outer contour-defining panel is substantially minimized.

18. The automobile body panel of claim 1 wherein said panel is an automobile front-end body panel, for use an automobile structure having a pair of "A" pillars, and wherein:

said outer contour-defining component includes a fender portion and a hood portion; and said side members comprise rearward facing end portions comprising means for forming a structural interface with each "A" pillar of the automobile structure.

19. The automobile front-end body panel of claim 18 wherein:

said outer contour-defining component, said side members, each internal member, and said bonding means comprise means cooperating to produce an automobile front end body panel which can be incorporated into an impact-resistant, crash energy absorbing, load bearing structure of an automobile.

20. The automobile front-end body panel of claim 18 wherein each "A" pillar has two vertically spaced, substantially cylindrical projections extending forwardly from said "A" pillar, and wherein:

said inner structural component comprises two pairs of side members each pair being located at a side of said panel;

said inner structural component comprises a single internal member having two end portions and three integrally connected segments;

said front member has an intermediate region located between said first and second end portions of said front member;

said rear member has an intermediate part having first and second end portions;

a first end portion of said internal member is fixedly attached to said rear member at said first end portion of said intermediate part of said rear member;

a first segment of said internal member extends between said first end portion of said intermediate part of said rear member and said intermediate part of said front member;

a second segment of said internal member extends across said intermediate part of said front member and is fixedly attached thereto;

a third segment of said internal member extends between said intermediate part of said front member and said second end portion of said intermediate part of said rear member;

a second end portion of said internal member is fixedly attached to said second end portion of said intermediate part of said rear member;

each side member and each internal member has a substantially closed cross-sectional geometry;

each pair of said side members comprises an upper and a lower side member;

each side member is rigidly attached to said front member;

each lower side member comprises a hinge means for pivotal attachment to a forward member of the automobile of which said panel is a part;

each rearward facing end portion is flared to align with each corresponding "A" pillar projection at an interface region; and said interface region comprises means for absorbing frontal impact energy and for transferring frontal impact loads from said front-end body panel to the remaining structure of the automobile of which said panel is a part.

21. The automobile front-end body panel of claim 18 wherein:

said outer contour-defining component, said side members, each internal member, and said bonding means comprise means cooperating to produce an automobile front-end body panel which is resistant to oil canning and puckering.

22. The automobile body panel of claim 1 further including an anti-palm printing means associated with at least one of said internal members.

23. The automobile body panel of claim 22 wherein:

said anti-palm printing means comprises an anti-palm printing member fixedly attached to said front member; and said anti-palm printing member is fixedly attached to at least one of said internal members.

24. The automobile body panel of claim 1 wherein:

said outer contour-defining component is joined to said side members by hemming.

* * * * *

UNITED STATES PATENT AND TRADEMARK OFFICE
CERTIFICATE OF CORRECTION

PATENT NO. : 5,605,371
DATED : February 25, 1997
INVENTOR(S) : James E. Borchelt, John M. Lude and Bernard S. Levy It is certified that error appears in the above-identified patent and that said Letters Patent is hereby corrected as shown below:

Col. 6, line 14,    "hydrogorming" should be --hydroforming--.

Col. 6, line 22,    "ccommodate" should be --accommodate--.

Col. 7, line 2,     delete "." after 50.

IN THE CLAIMS

Col. 11, line 42,   after "use" insert --with--.

Signed and Sealed this

Twelfth Day of August, 1997

Attest:

BRUCE LEHMAN

Attesting Officer    Commissioner of Patents and Trademarks